United States Patent [19]
Mott

[11] Patent Number: 4,943,266
[45] Date of Patent: Jul. 24, 1990

[54] METAL CHAIN BELT

[75] Inventor: Philip J. Mott, Des Plaines, Ill.

[73] Assignee: Borg-Warner Corporation, Chicago, Ill.

[21] Appl. No.: 326,464

[22] Filed: Mar. 20, 1989

Related U.S. Application Data

[63] Continuation of Ser. No. 676,143, Nov. 29, 1984, abandoned.

[51] Int. Cl.⁵ .............................................. F16G 5/18
[52] U.S. Cl. .................................... 474/201; 474/245
[58] Field of Search ................ 474/201, 242, 244, 245

[56] References Cited

U.S. PATENT DOCUMENTS

| | | |
|---|---|---|
| 1,868,334 | 7/1932 | Morse . |
| 3,720,113 | 3/1973 | Van Doorne et al. ............. 474/242 |
| 4,313,730 | 2/1982 | Cole et al. ............................ 474/201 |
| 4,344,761 | 8/1982 | Steuer .................................. 474/245 |
| 4,507,106 | 3/1985 | Cole .................................... 474/215 |
| 4,512,754 | 4/1985 | Cole et al. ............................ 474/245 |
| 4,516,965 | 5/1985 | Mott ................................ 474/201 X |

Primary Examiner—William P. Neuder
Attorney, Agent, or Firm—Emch, Schaffer, Schaub & Porcello

[57] ABSTRACT

An endless power transmission chain-belt constructed of joined sets of links and blocks surrounding sets of links, the links in some sets having a pitch larger than links in other sets. Some blocks are of such width to engage pulley flanges of a pulley transmission while other blocks are of a lesser width to "skip" the flange engagement. The latter blocks can be omitted, if desired.

12 Claims, 4 Drawing Sheets

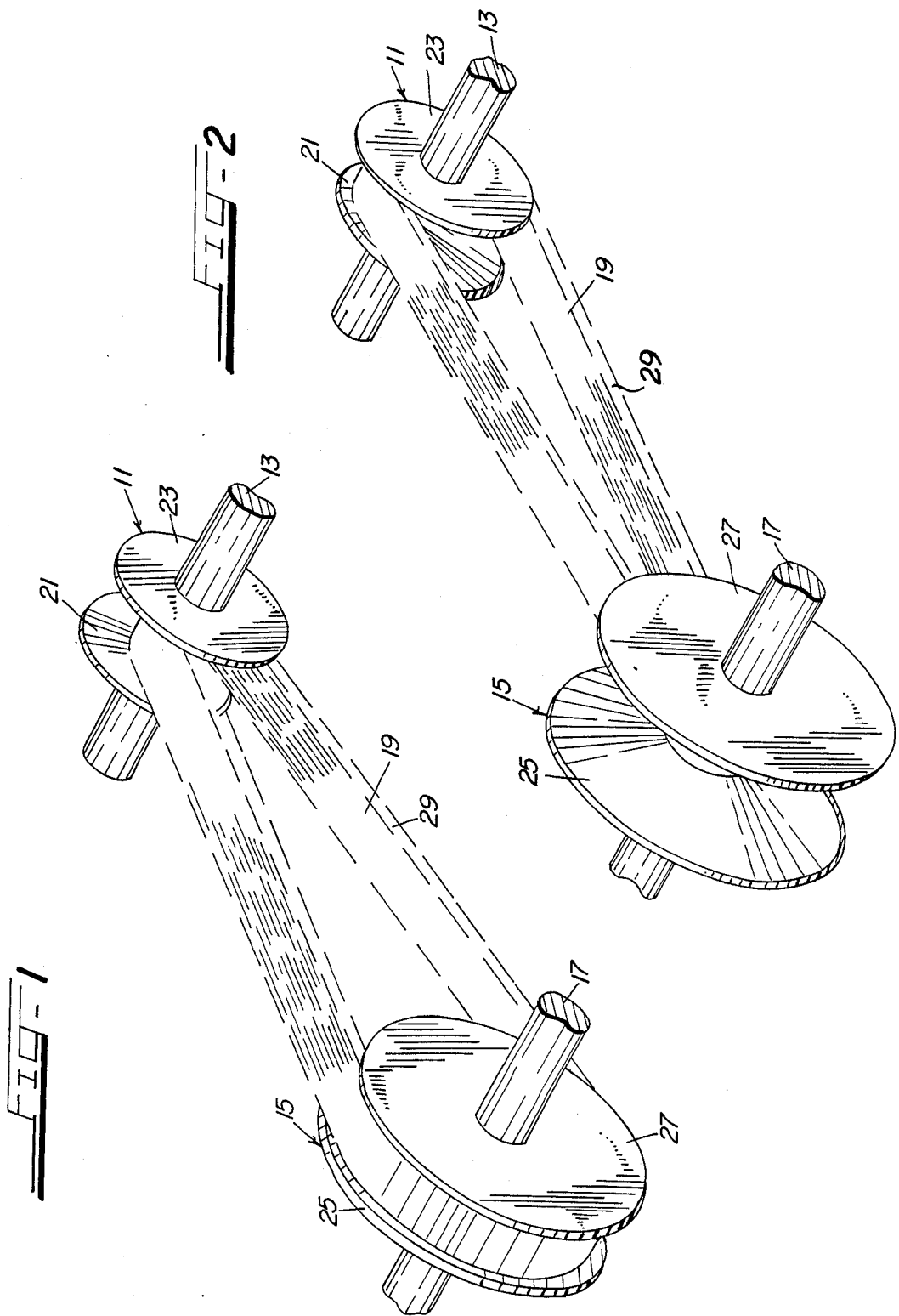

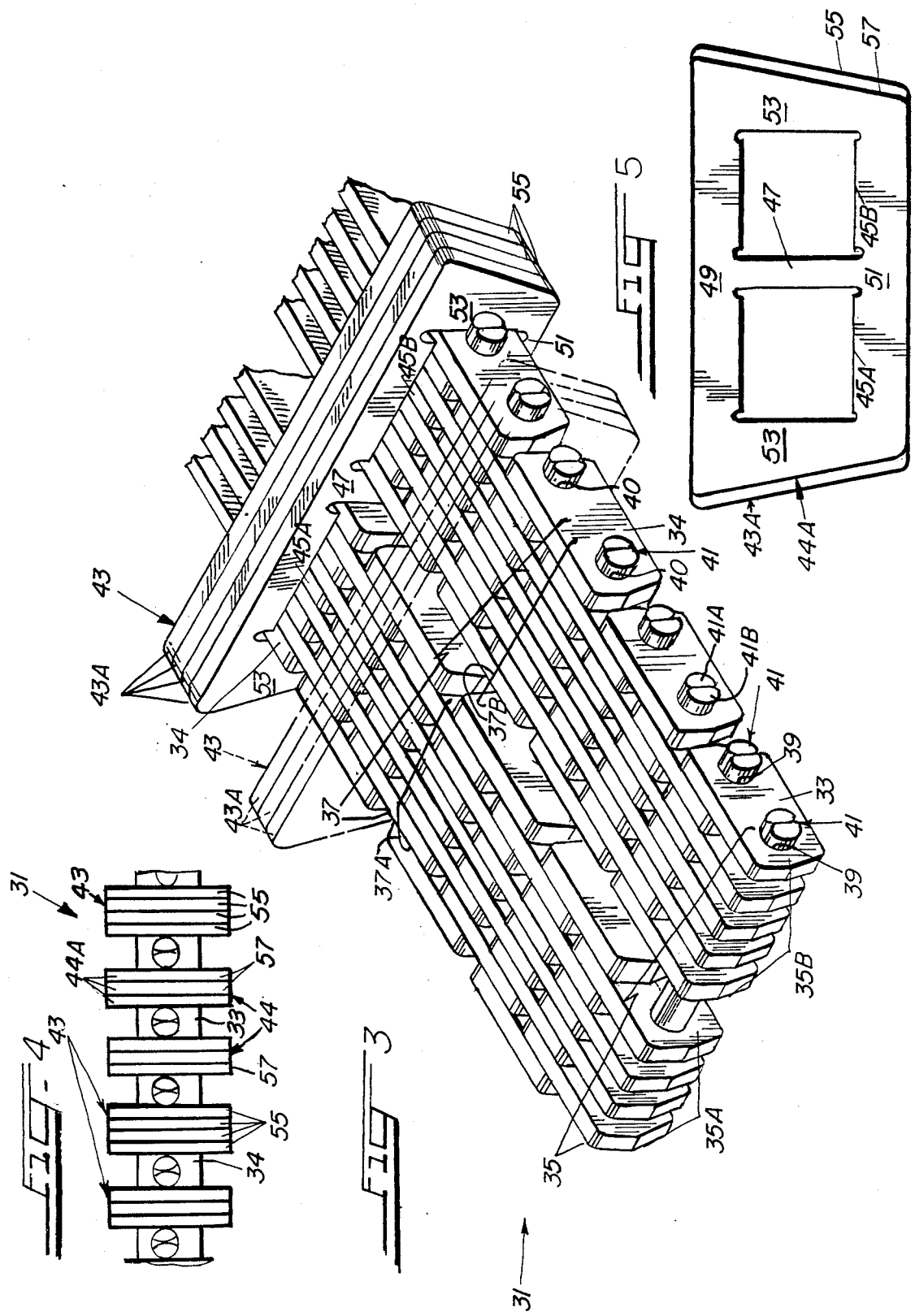

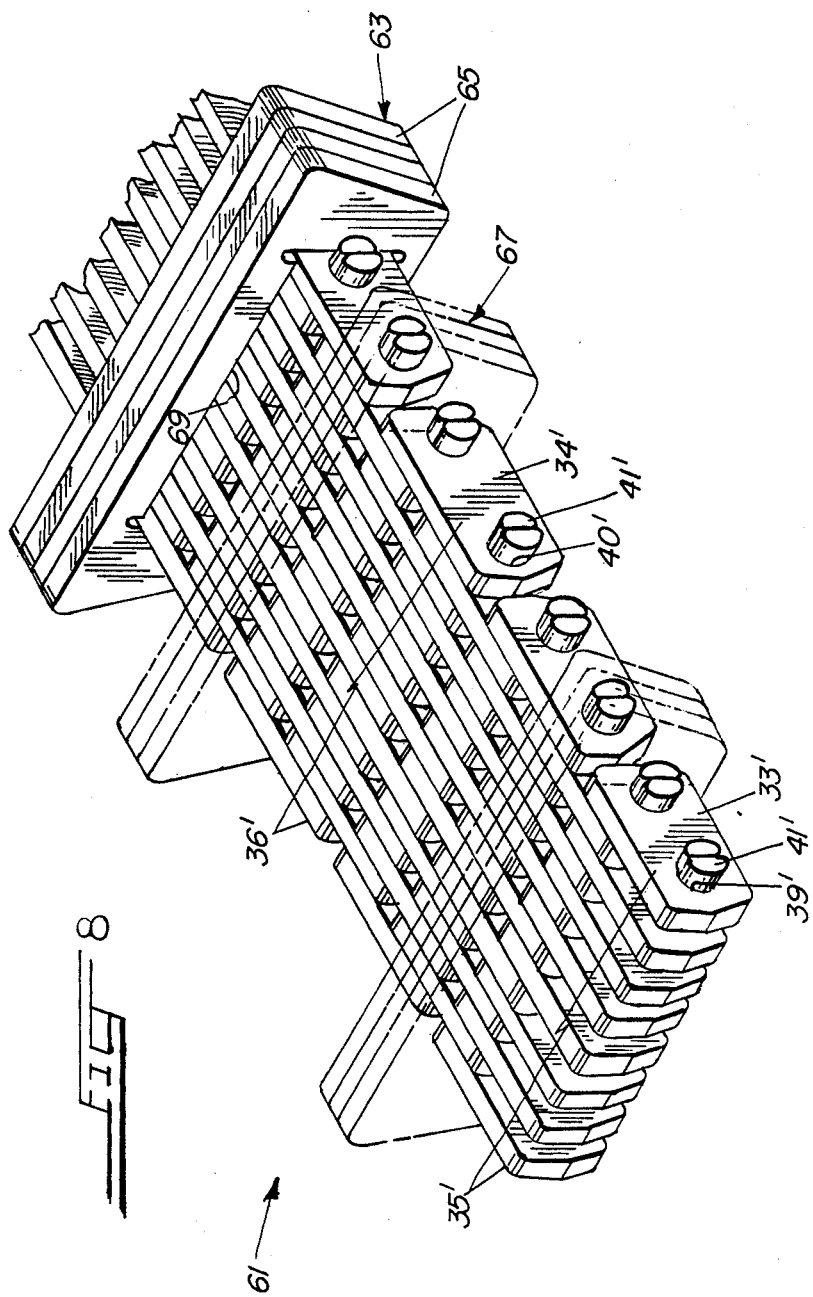

METAL CHAIN BELT

This is a continuation of application Ser. No. 676,143, filed on Nov. 29, 1984 now abandoned.

BACKGROUND OF THE INVENTION

This invention relates to an endless metal power transmission chain-belt constructed to interconnect the pulleys of a pulley transmission, as for example, a continuously variable transmission (CVT), especially in a motor vehicle. More particularly the invention relates to a chain-belt constructed of interconnected links and drive or load blocks.

Variable pulley transmissions for automotive use have been suggested for many years. In those transmissions, at least one flange of each pulley is axially movable with respect to the other; as the effective diameter of one pulley is changed, the effective diameter of the other is simultaneously changed in the opposite direction. Thus speed ratio changes are effected continuously in a smooth manner. It is now anticipated that they will soon be widely used in automobiles. They have already been used in some commercial automobiles, such as a Dutch car called the "Daf". In the early constructions, elastomer belts were used to transfer the torque between the drive and driven shafts; the "Daf" car apparently used elastomer belts. In the later cars, a metal belt was used, the belt comprised a carrier and drive or load blocks thereon which drivingly contacted the pulley flanges. Typically the belt used was a "push" belt generally kind taught by the Van Doorne et al patent, No 3,720,113, to be discussed in more detail herein.

The push belt of Van Doorne et al's construction is relatively expensive to manufacture because the nested bands must be precision matched to each other. A "pull" belt in which drive or load blocks are substantially fixedly positioned on a chain or other carrier similar to that taught by Cole et al patent No. 4,313,730, has a substantial cost advantage over the described push belt because the chain links and the load blocks are stamped from sheet stock, the pivot members are cordwood cut from extruded stock material, and for the most part, assembly is by automatic assembly machines. The Cole et al patent is also discussed in more detail herein.

Aside from costs, a major concern of automotive engineers is noise generation by drive belts for pulley transmissions.

A certain amount of noise is generated when drive blocks engage the flanges of the pulleys, and when the noise manifests itself in a fixed pattern, it is objectionable to humans. Noise of a mixture of frequencies is less objectionable. Automotive engineers rate noise generated by drive belts of the type described herein in a generally subjective manner by driving or riding in an automobile in which the belt is installed and listening to the generated noise. The noise is then rated on a numerical scale of 1 to 10 with the higher numbers indicating the less objectionable noise.

DESCRIPTION OF THE PRIOR ART

Cole et al, U.S. Pat. No. 4,313,730 granted Feb. 2, 1982, and assigned to the assignee of the present invention, teaches a metal chain-belt especially adapted for drivingly interconnecting the pulleys of a pulley transmission. The chain-belt comprises a plurality of sets of links, the adjacent sets of which are interleaved with one another, a set of links comprising a number of transversely aligned links. The interleaved sets of links are joined by pivot means, such as a round pin or a pin and rocker, both known in the art, to permit the chain to articulate. A metal load block surrounds or encircles each set of links between adjacent pivot means, and each block is substantially fixedly positioned with respect to a set of links. Each load block can comprise a plurality of relatively thin plates stamped from sheet metal. Each load block is generally trapezoidal in shape when viewed from the front, and at least portions of the side edges engage the pulley flanges of the pulley transmission. In the Cole et al patent, the pitch of each link, defined as the distance between pivot centers of each link, is the same for all links. For a round pin chain, a pivot center is a line passing axially through the center of the pin. For a pin and rocker joint, a pivot center is an axial line passing through the point of contact between a pin and a rocker.

Steuer, in U.S. Pat. No. 4,344,761 teaches a metal chain-belt in which the ends of the pivot members engage the pulley flanges of a pulley transmission. The lengths of "selected ones of the links, between associated articulations, are made different from those of the remainder of the links of the chain." Thus the distance between some pivot centers is different from the distance between other pivot centers; in other words, the pitch of some links is different from the pitch of other links in the chain.

Morse U.S. Pat. No. 1,868,334, issued Jul. 19, 1932, teaches the concept of constructing a chain (not described for use in a pulley transmission) with effective pitches of different lengths. This is accomplished by orienting the joint or pivot members differently in various parts of the chain. All links in the patented structure are the same in form and length.

Van Doorne et al, in U.S. Pat. No. 3,720,113, granted Mar. 13, 1973, and mentioned before, teaches the use of a carrier comprising matched and nested metal bands with drive blocks longitudinally movable thereon. The edges of the blocks contact the pulley flanges of a pulley transmission.

In copending U.S. application Ser. No. 497,480, now U.S. Pat. No. 4,516,965, filed May 23, 1983, now U.S. Pat. No. 4,516,965, there is disclosed and claimed the concept of constructing a chain-belt with some load blocks that do not contact the pulley flanges. These blocks are also known as "skip" blocks. The skip blocks can be omitted, if desired, so that some sets of links are free of encirclement by a load block.

The concept of using multi-windowed load blocks in a chain-belt construction is disclosed and claimed in copending U.S. patent application Ser. No. 485,781 now U.S. Pat. No. 4,512,754 filed Apr. 18, 1983, now U.S. Pat. No. 4,512,754, a window being defined as an opening for receiving chain links (or bands if used). Here each set of links is divided into transversely spaced subsets and each subset is received in a window of the block.

A rocker joint construction comprising a pair of pivot members, each having the same cross-sectional configuration, and usable in a chain-belt construction is disclosed and claimed in copending U.S. patent application Ser. No. 442,386, filed Nov. 17, 1982 now U.S. Pat. No. 4,507,106. The pivot members each have a facing surface defined by a large radius and a rear surface defined by smaller radii joined to the facing surface by even smaller radius surfaces.

The above-noted copending applications are owned by the assignee of the present invention.

SUMMARY OF THE INVENTION

This invention relates to an improved chain-belt comprising the combination of a carrier of interleaved sets of links joined by pivot means. Drive blocks are positioned between adjacent pivot means, and each block surrounds a set of links. The pitch of the links in some sets of links is different from the pitch of the links in other sets of links; additionally, some load blocks surrounding some sets of links are constructed so as not to contact the pulley flanges. In other words, there are some "skip" blocks in the assembly. Preferably, the skip blocks are associated with sets of links of one of the pitches and not the other. The blocks can be of the multiple window-type described in the aforesaid Cole et al application, so that the sets of links in the chain-belt are assembled in laterally spaced groups or subsets, or the blocks can be of the single window type as described and claimed in the aforesaid Cole et al patent. In any case, each load block is preferably constructed of multiple plates to enhance the manufacture thereof with the links of one pitch surrounded by blocks of a first number of plates and the links of a longer pitch being surrounded by blocks of a greater number of plates.

In a preferred embodiment, the chain-belt of this invention comprises a carrier comprising a plurality of sets of links; each link defining a pair of spaced-apart pivot centers, the distance between adjacent pivot centers defining the pitch of a link, which links are arranged in sets, some sets of links having a first pitch and other sets of links having a second pitch which differs from the first pitch; means joining adjacent sets of links and permitting articulation of said carrier about said pivot centers; and a plurality of generally trapezoidal blocks, certain ones of said blocks surrounding at least some sets of links, some of said blocks having a transverse width so that they contact the pulley flanges, and others of said blocks having a lesser transverse width so that they avoid contact with the pulley flanges.

BRIEF DESCRIPTION OF THE DRAWINGS

FIGS. 1 and 2 are schematic illustrations of a variable pulley transmission in the extreme drive ratios;

FIG. 3 is a perspective illustration of a portion or segment of one form of chain-belt constructed according to this invention;

FIG. 4 is a side elevational view of a portion of the chain-belt of FIG. 3;

FIG. 5 is a front elevational view of the different load block plates, one superimposed on the other, used in the chain-belt of FIGS. 3 and 4;

FIG. 8 is a perspective illustration of a portion or segment of a second form of chain-belt constructed according to this invention.

DETAILED DESCRIPTION OF THE PREFERRED EMBODIMENT

Figure 6:
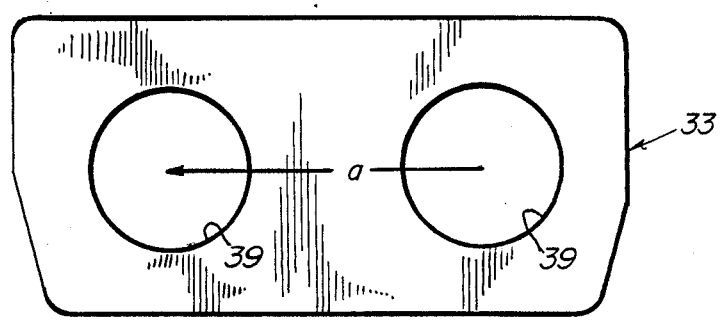
FIGS. 6 and 7 are front elevations of the two different pitch links used in the chain-belt of FIGS. 3 and 4.

FIGS. 1 and 2 of the drawings illustrate schematically a continuously variable transmission (CVT) in two drive ratios, i.e., the underdrive and overdrive ratios. A first pulley 11 is connected to a shaft 13 and a second pulley 15 is connected to a shaft 17. One shaft is a drive shaft and the other shaft is a driven shaft. A continuous, flexible belt 19 interconnects the pulleys 11 and 15. Pulley 11 comprises flanges 21 and 23 while pulley 15 comprises flanges 25 and 27. In order to change the drive ratio between the pulleys and the shafts, flange 21 of pulley 11 is made axially movable with respect to flange 23, and correspondingly, flange 27 of pulley 15 is axially movable with respect to flange 25. It is understood that both flanges of a pulley may be axially movable with respect to each other, but generally this is not necessary to effect the changes in the drive ratios between the pulleys and their respective shafts. Various types of controls may be used to effect the changes in drive ratio but these are not within the purview of this invention and need no further reference. As can be readily understood, the side surfaces or edges 29 of the continuous, flexible belt 19 frictionally engage the pulley flanges when transmitting torque from the drive pulley to the driven pulley.

One form of an improved chain-belt of this invention is illustrated in FIGS. 3 and 4, and a segment is identified as 31, it being understood that a complete belt is a continuous, endless loop. The chain-belt has a carrier comprising links 33 and 34 arranged in sets 35 and 37 which are interleaved with one another. A "set" of links is those links (either 33 or 34) which are grouped transversely together. Here each set 35 and 37 includes two subsets 35A, 35B and 37A, 37B, spaced apart from each other for reasons that will become apparent. The illustrated lacing of the subsets is in a 4-5, 5-4, 4-5, etc. pattern (other patterns can be used depending upon the width of the carrier). Each link 33 or 34 is provided with a pair of spaced apertures 39 or 40, respectively, each aperture being adjacent to an end of the link, and the apertures in a set are transversely aligned with one another. When interleaved with other sets of links, the apertures at one end are transversely aligned with those in the interleaved set, so that a pivot means 41 can be passed therethrough. The links 33 and 34 differ from each other in "pitch", pitch being the horizontal distance between pivot centers of a link. The pivot means 41 is illustrated as a pin 41A and a rocker 41B, each having the same cross-section and differing, if at all, in length, depending upon the construction of the chain. The use of a pin and rocker joint is conventional. The specific joint illustrated, however, is described and claimed in the aforesaid U.S. Pat. No. 4,507,106. The pivot means, if desired, can be a conventional round pin, as known in the art.

To frictionally engage the pulley flanges, a plurality of load blocks 43 are used. However, unlike some chain-belts, there are blocks which may appear to be load blocks dispersed throughout the length of the chain-belt but do not frictionally engage the pulley flanges. Such blocks are identified as 44, and will be referred to as "skip" blocks. The main physical difference between blocks 43 and 44 is their width, i.e., the lateral or side-to-side measurement. Block 44 is not as wide as block 43. Regardless of whether the block is a load block 43 or a skip block 44, it is generally trapezoidal in shape when viewed from the front, and to reduce manufacturing costs, is constructed as a laminate of several, thinner plates or members 43A or 44A. Blocks can be solid members, if desired. Load blocks 43 or 44 longitudinally span the space between adjacent pivot means regardless of whether they are constructed of several thin plates or solid members. Therefore, blocks surrounding the the longer pitch links 34 are thicker than those surrounding the links 33. A comparison of the lateral dimensions of block plates 43A and 44A is shown in FIG. 5. Each block is shown as it would be positioned to encircle a set of links between pivot means, and each block defines, in the illustrated form, a pair of centrally located windows 45A and 45B separated by a strut 47. Strut 47 joins the top and bottom portions 49 and 51 which, in turn join the edge parts 53, 53. Edge parts 53 of blocks 43 define edge surfaces 55 which are adapted to frictionally engage the pulley flanges. Edge surfaces 57 of blocks 44 are not adapted to contact the pulley flanges. In some chain-belts, the skip blocks 44 can be omitted, so the chain-belt comprises a carrier as before described with some sets of links free of encirclement by a block.

Figure 7:
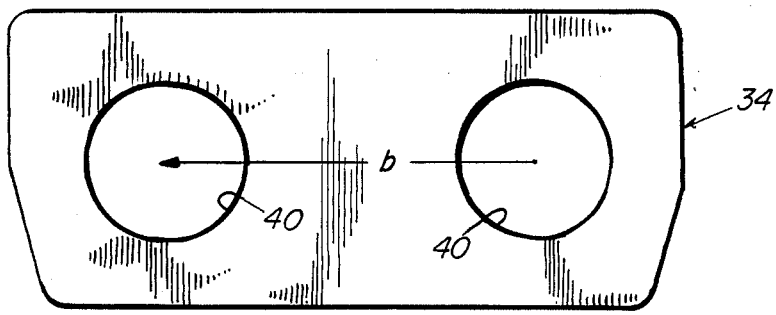

As previously stated, the carrier comprises a certain mixture of sets of links 33 and sets of links 34. Links 33, illustrated in FIG. 6, have spaced apertures 39, the center-to-center spacing being the pitch "a", while links 34, illustrated in FIG. 7, have spaced apertures 40, the center-to-center spacing being the pitch "b". The pitch b is larger than pitch a.

A second form of improved chain-belt is illustrated in FIG. 8 and the segment of the chain-belt is identified by the reference character 61, again it being understood that a complete belt is an endless loop. Chain-belt 61 comprises a carrier composed of links 33' and 34' arranged in sets 35' and 36'. This carrier differs from the form of FIG. 3 in that the lacing is in a 7-8-7-8 etc. pattern as opposed to subset construction, it being understood that other lacing patterns can be used without departing from the spirit of the invention. The links 33' and 34' are the same as the described links 33 and 34, (see FIGS. 6 and 7). Each link 33' or 34' is provided with spaced apertures 39' or 40', as the case may be, and the assembly of link sets is joined by pivot means 41' of the same construction as pivot means 41. Other types of joints known in the art, can be used without departing from the spirit of the invention.

To frictionally engage the pulley flanges, a plurality of load blocks 63 are used. Blocks 63 have edge surfaces 65 adapted to frictionally engage pulley flanges. Also, there are a number of "skip" blocks 67 throughout the length of the chain-belt, as in the previously described form, which blocks can be omitted, if desired. Blocks 63 and 67 are generally trapezoidal in shape when viewed from the front. They can be a composite of several relatively thin plates, or can be solid members, and can differ in longitudinal thickness depending upon the links which with they are associated. Each block has a single window 69 surrounding its set of links. Thus, basically the differences between the two embodiments are in lacing of set of links and the number of windows in the blocks.

In evaluating a chain-belt, as described, trained observers rate the performance using a "Vehicle Evaluation Rating System." A form for such system is reproduced below.

| | VEHICLE EVALUATION RATING SYSTEM | | | | | | | | |
|---|---|---|---|---|---|---|---|---|---|
| | UNACCEPTABLE | | | BORDER LINE ACCEPTABLE | | ACCEPTABLE | | | |
| RATING INDEX | 1 | 2 | 3 | 4 | 5 | 6 | 7 | 8 | 9 | 10 |
| EVALUATION OF ANY PARTICULAR VEHICLE COMPONENT PERFORMANCE | POOR | | CUSTOMER COMPLAINT | BORDER LINE | BARELY ACCEPTABLE | | FAIR | GOOD | VERY GOOD | EXCELLENT |
| NOISE, VIBRATION, HARSHNESS, SHAKE ETC. | NOT ACCEPTABLE | | OBJECTIONABLE | REQUIRES IMPROVEMENT | MEDIUM | | LIGHT | VERY LIGHT | TRACE | NOT NOTICABLE |
| CONDITION NOTED BY | ALL CUSTOMERS | | AVERAGE CUSTOMER | CRITICAL CUSTOMER | | | TRAINED OBSERVER | | | NOT PERCEPTABLE |
| PROCEDURE | REQUIRES ACTION | | | INVESTIGATION REQUIRED | | | ACCEPT | | | CHECK RESULTS |

Chain-belts constructed in accordance with the invention described have been rated at least with a noise rating index of 7, which is relatively high for such a product.

A chain-belt of the form of FIGS. 3 and 4 was constructed with a carrier of 104 sets of links. The pivot construction was a pin and rocker as described herein. Each pin or rocker had a front surface of a relatively large radius and a back surface of smaller radii. The carrier had 20 sets of long pitch links, i.e., 0.355 inch in this embodiment, and 84 sets of links having a pitch of 0.306 inch. There were 20 skip blocks in the chain-belt, each skip block encircling a set of links having the smaller pitch. The sets of longer pitch links were numbered, 1, 4, 9, 12, 15, 18, 23, 30, 35, 42, 45, 48, 53, 58, 65, 72, 77, 82, 87 and 92 and the skip block sets of links were numbered 3, 6, 11, 14, 16, 24, 27, 34, 39, 43, 47, 49, 56, 62, 69, 76, 81, 86, 90 and 93, indicating a random mixture of sets of links with longer and shorter pitches and a random pattern of skip blocks.

In another chain-belt of the form of FIG. 8, the carrier had a total of 90 sets of links. The carrier had 18 sets of links with a pitch of 0.355 inch and 72 sets of links with a pitch of 0.306 inch. The pivot members were a pin and rocker, each having the same cross-section as described above. There were 18 skip blocks in the chain-belt, each skip block encircling a set of links having the smaller pitch. The sets of links of longer pitch were numbered 1, 4, 9, 12, 15, 18, 23, 30, 35, 42, 45, 48, 53, 58, 65, 72, 79 and 84, indicating a random pattern of sets of links with longer and shorter pitches, and the skip blocks were associated with links sets 3, 6, 11, 14, 16, 24, 27, 34, 39, 43, 47, 49, 56, 62, 69, 76, 83 and 88, also indicating a random pattern of skip blocks.

Further testing of chain-belts comprising various combinations of sets of links of two pitches, skip blocks and load blocks has indicated that, as far as the generation of undesirable noise is concerned, diminishing returns are obtained after the numbers of sets of links with large pitch and skip blocks exceed 40% of the total number of sets of links and, also, that the best results, as far as noise generation is concerned, i.e., the lowest noise level, is achieved when a chain-belt is constructed with an equal number of sets of links with longer pitch and skip blocks.

Figure 9:
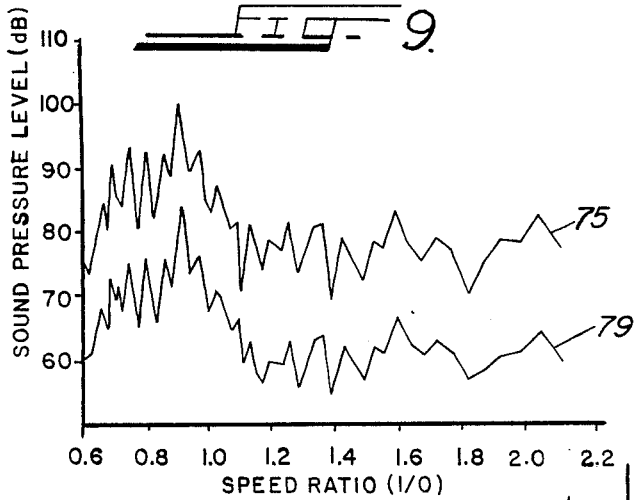
FIGS. 9 and 10 are graphs, respectively, of noise levels generated by a prior art chain-belt and a chain-belt constructed according to this invention.
Figure 10:
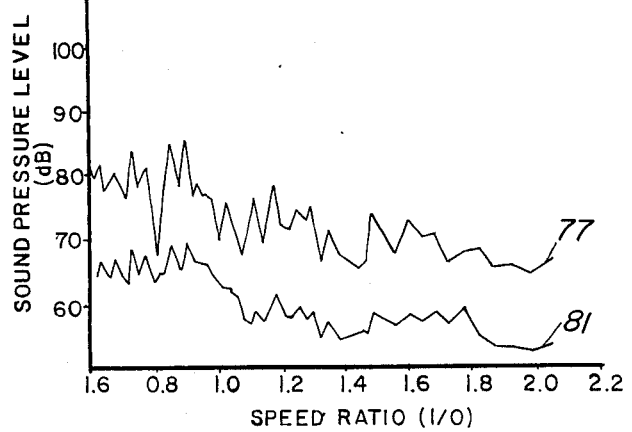

FIGS. 9 and 10 are plots of speed ratios vs. sound level in dB's, depicting noise generation by two chain-belts run at 2500 rpm input speed on a pulley transmission similar to that depicted in FIGS. 1 and 2. The first (FIG. 9) was of the type described and claimed in the aforesaid Cole et al patent, and the second (FIG. 10) was of the type described herein, particularly the construction of FIGS. 3 and 4. The curves 75, 77 depict the noise amplitudes of the fundamental frequency while the curves 79, 81 depict the level of the surrounding background noise. Comparison of the curves show the noise reduction in dB's at both the fundamental frequency and the background noise by the chain-belt of this invention.

The readings for these plots were taken in sound enclosures built around the pulley transmission. Electronic equipment was used to record sound levels, as opposed to the subjective determination of the numerical rating 7 previously described.

The appended claims are intended to cover all reasonable equivalents of the structure.

I claim:

1. An endless power transmission chain-belt comprising:
    a carrier comprising a plurality of sets of links; each link defining a pair of spaced-apart pivot centers, the distance between adjacent pivot centers defining the pitch of a link, which links are arranged in sets, some sets of links having a first pitch and other sets of links having a second pitch longer than the first pitch;
    means joining adjacent sets of links and permitting articulation of said carrier about said pivot centers; and,
    a plurality of generally trapezoidal blocks, said blocks being secured transversely across the sets of links of said second pitch and said blocks being secured transversely across less than all of the sets of links of said first pitch.

2. An endless power transmission chain-belt comprising the combination of sets of links, some of which are constructed of links of a first pitch and some of which are constructed of links of a second pitch which is larger than the first pitch and a load block secured to less than all of said sets of links having said first pitch and a load block secured to each of said sets of links having said second pitch, said load blocks being generally trapezoidal in shape when viewed from the front with side edges adapted to frictionally engage the flanges of pulleys of a pulley transmission.

3. An endless power transmission chain-belt for interconnecting the pulleys of a pulley transmission in which each pulley is constructed of a pair of flanges, said chain-belt comprising:
    a carrier comprising a plurality of sets of links; each link defining a pair of spaced-apart pivot centers, the distance between adjacent pivot centers defining the pitch of a link, which links are arranged in sets, some sets of links having a first pitch and other sets of links having a second longer pitch;
    means joining adjacent sets of links and permitting articulation of said carrier about said pivot centers; and
    a plurality of generally trapezoidal blocks, certain ones of said blocks being secured to at least some sets of links and having a transverse width so that they contact the pulley flanges, and others of said blocks having a lesser transverse width so that they avoid contact with the pulley flanges.

4. An endless power transmission chain-belt as recited in claim 3, wherein a block is secured to at least each of some sets of links having said first pitch, and a block is secured to each of said sets of links having said second pitch.

5. An endless power transmission chain-belt as recited in claim 4, in which the number of sets of links to which blocks are secured is less than the number of sets of links in said carrier.

6. An endless power transmission chain-belt comprising:
    a carrier comprising a plurality of sets of links; each link defining a pair of spaced-apart pivot centers, the distance between adjacent pivot centers defining the pitch of a link, which links are arranged in sets, some sets of links having a first pitch and other sets of links having a second pitch longer than the first pitch;
    means joining adjacent sets of links and permitting articulation of said carrier about said pivot centers; and
    a plurality of generally trapezoidal blocks, said trapezoidal blocks include a plurality of blocks having a first transverse width and a plurality of other blocks having a lesser transverse width, said blocks being secured transversely across the sets of links of said second pitch and at least some sets of links of said first pitch.

7. An endless power transmission chain-belt as recited in claim 6, wherein the number of sets of links of said second pitch and the number of blocks having a lesser transverse width are equal.

8. An endless power transmission chain-belt as recited in claim 7, wherein said number of sets of links of said second pitch does not exceed 20% of the total number of said links.

9. An endless power transmission chain-belt as recited in claim 7, wherein said number of blocks having a lesser transverse width does not exceed 20% of the total number of blocks.

10. An endless power transmission chain-belt as recited in claim 6, wherein said number of sets of links of said second pitch and the number of blocks having a lesser transverse width are not greater than 40% of the total number of such links and blocks.

11. An endless power transmission chain-belt as recited in claim 6, in which said blocks having a lesser transverse width are secured to sets of links having said first pitch.

12. An endless power transmission chain-belt as recited in claim 6, in which said sets of links of said second pitch and said blocks having a lesser transverse width are randomly dispersed in said chain-belt.

* * * * *